United States Patent [19]

Chacko et al.

[11] Patent Number: 5,153,275

[45] Date of Patent: * Oct. 6, 1992

[54] POLYAMIDE COMPOSITIONS COMPRISING POLY(AMIDE-ETHER) BLOCK COPOLYMERS FEATURING IMPROVED IMPACT STRENGTH AND IMPROVED FILM PROPERTIES

[75] Inventors: Varkki P. Chacko, Summit; George M. Johns, Morristown; Mocherla K. Rao, Woodbridge; Michael F. Tubridy, Morristown; Donald F. Stewart, Whippany, all of N.J.

[73] Assignee: Allied-Signal Inc., Morris Township, Morris County, N.J.

[ * ] Notice: The portion of the term of this patent subsequent to Nov. 13, 2007 has been disclaimed.

[21] Appl. No.: 572,293

[22] Filed: Aug. 27, 1990

Related U.S. Application Data

[60] Division of Ser. No. 346,264, May 1, 1989, Pat. No. 4,970,274, which is a continuation of Ser. No. 252,004, Sep. 30, 1988, abandoned, which is a continuation of Ser. No. 131,336, Dec. 9, 1987, abandoned, which is a continuation of Ser. No. 806,920, Dec. 9, 1985, abandoned.

[51] Int. Cl.$^5$ .............................................. C08L 77/00
[52] U.S. Cl. ..................................... 525/432; 525/434
[58] Field of Search ............................. 525/432, 434

[56] References Cited

U.S. PATENT DOCUMENTS 3,549,724  12/1970  Okazaki et al. .................... 525/408
4,331,786  5/1982  Foy et al. ........................... 525/408

*Primary Examiner*—Ana L. Carrillo
*Attorney, Agent, or Firm*—Andrew N. Parfomak; Roger H. Criss

[57] ABSTRACT

Nylon compositions useful for molding and film applications with film properties and impact strength are made of a polyamide resin and a block copolymer of poly(amide-ether) of the formula

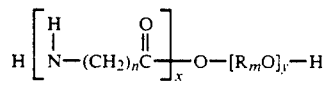

where R is an alkyl or substituted alkyl group with from one to 12 carbons, n is an integer from 2 to 20, m is an integer from 1 to 6, and x and y are numbers from about 50 to about 30,000. In one embodiment, a non-polymeric amide is added to the composition. Articles made from the claimed compositions have improved impact strength; films made from the compositions have improved drapeability over the unmodified resin, both at room temperature and after heat-aging. Reinforced compositions are obtained by including mineral and other reinforcing fillers, including glass fibers, in the extrusion process. The reinforced compositions exhibit improved impact characteristics.

12 Claims, No Drawings

POLYAMIDE COMPOSITIONS COMPRISING POLY(AMIDE-ETHER) BLOCK COPOLYMERS FEATURING IMPROVED IMPACT STRENGTH AND IMPROVED FILM PROPERTIES

This application is a division of application Ser. No. 346,264, filed May 1, 1989 now U.S. Pat. No. 4,970,274, which is a continuation of Ser. No. 252,004, filed Sep. 30, 1988, abandoned, which is a continuation of Ser. No. 131,336, filed Dec. 9, 1987, abandoned, which is a continuation of Ser. No. 806,920, filed Dec. 9, 1985.

BACKGROUND OF THE INVENTION

1. Field of the Invention

The present invention is in the field of improved polyamide compositions. More particularly, this invention is in the field of nylon compositions for molding and extruding, both with and without reinforcement, and for use as film.

2. Description of the Prior Art

Polyamides, sometimes known broadly as nylon compositions, have long been used in molding applications requiring stiffness, impact toughness, and good strength characteristics; in these applications, the plastic material is used both as is, and with various kinds of reinforcement; examples of such compositions are disclosed in U.S. Pat. No. 4,495,324. Polyamides have also been used widely in a film form for packaging, food, medical and industrial applications. Polyamides are useful as film due to their chemical resistance, toughness and strength.

In certain molding applications, reinforcement of the resin has achieved adequate results in some desired parameters, although at a sacrifice in others. In the particular application of a nylon composition for a molding compound, the addition of glass fibers has resulted in a stiffness of the material which can increase the time and effort required to cause the material to conform to, e.g., molds and forms.

In certain film uses, the ability of a polyamide film to drape or conform to a particular shape is a desirable characteristic which is not easily achieved, due to the stiffness of the polyamide composition. It is necessary to modify this stiffness. In addition, films now known in the art have a tendency to stiffen upon exposure to heat, hindering their utility in applications such as vacuum forming. Plasticizers of various natures have been used in attempts to provide good film properties, but the addition of a low-molecular-weight plasticizer can lead to its plating out on chill rolls, exuding from, and therefore embrittling, the film over time, and otherwise detracting from the efficacious use of the film.

SUMMARY OF THE INVENTION

The present invention is a polyamide composition useful as a molding composition and to form film. The film has superior fabric hand, and the composition results in molded articles with high impact strength. The compositions can be produced by melt-blending a polyamide and a block copolymer or terpolymer of a polyamide and polyether, a poly(amide-ether), block copolymer. A preferred formula for the poly(amide-ether) block copolymer is:

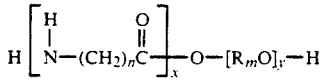

where R is an alkyl or substituted alkyl group with from one to about 12 carbons, n is an integer from 2 to 20, and preferably 4 to 12, m is an integer from 1 to 6, and preferably from 2 to 4, and x and y are numbers from about 50 to about 30,000, preferably from about 2,000 to about 10,000. Films formed from the composition have improved drape and hand properties. In a preferred embodiment, a non-polymeric amide is added to the composition, resulting in a film with good drapeability. Compositions useful in molding have enhanced impact strength. Reinforced compositions can be obtained by adding a reinforcement, preferably glass fiber, to the composition.

DESCRIPTION OF THE PREFERRED EMBODIMENTS

The present invention comprises melt-blended polyamide compositions containing a poly(amide-ether) block copolymer, polyamide modifiers for film applications, and reinforcement for molding compositions.

The present invention comprises a polyamide composition having from about 70 to about 98% by weight of a polyamide. Preferred polyamides include nylon 6 (polycaprolactam), nylon 6,6 (polyhexamethylene adipamide), nylon 6,10 and nylon 6,12. There is from about 2% to about 30% by weight of poly(amide-ether) block copolymer. The poly(amide-ether) block copolymer preferably has the the formula

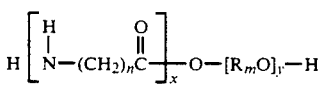

where R is an alkyl group with from one to about 12 carbons, n is an integer from 2 to 20, and preferably 4 to 12, m is an integer from 1 to 6, and preferably 2 to 4, and x and y are numbers from about 50 to about 30,000, preferably from about 2000 to about 10,000. The block copolymer can contain minor amounts, up to about 10% by weight, of other comonomers. The block copolymer can contain acids such as dicarboxylic acids used to form the polyamide blocks, such as adipic acid, sebacic acid, dodecanoic acid used to form polyamides with diamines such as hexamethylene diamine.

Articles molded from the materials thus prepared exhibit improved impact characteristics, and films of these materials have good drapeability, or hand. In a preferred embodiment, the addition of a non-polymeric amide such as a lactam, i.e., caprolactam or lauryl lactam, to the composition provides an improvement in film properties.

Preferred polyether blocks are based on polyethylene glycol, polypropylene glycol and polytetramethylene glycol. Preferred polyamide blocks are based on polycaprolactam (nylon-6) and nylon-12. The block copolymer typically has a Shore D hardness of from about 20 to about 75.

In an embodiment useful as a molding composition, the addition of from about 6 to 44, and preferably from about 14 to about 35% glass-fiber reinforcement to the foregoing compositions produces a stiff and tough material suitable for applications requiring impact resistance and moderate resistance to high temperatures.

Polyamides, commonly called nylons, suitable for use in the composition of the present invention incude polyamides which are long-chained polymeric amides having recurring amide groups as part of their polymer backbone. Preferably, the polyamides have a relative formic acid viscosity of from about 40 to about 250, measured in 90% formic acid at a concentration of 9.2 weight percent.

Non-limiting examples of such polyamides are:

(a) those prepared by the polymerization of lactams, preferably epsiloncaprolactam, commonly known as nylon 6.

(b) those prepared by the condensation of a diamine with a dibasic acid, preferably the condensation of hexamethylene diamine with adipic acid (nylon 6,6), the condensation of hexamethylene diamine with sebacic acid (nylon 6,10), and the condensation of hexamethylene diamine with dodecanoic acid (nylon 6,12);

(c) those prepared by self-condensation of amino acids, preferably self-condensation of 1-aminoundecanoic acid (nylon 11); and (d) those based on polymerized vegetable-oil acids, or random, block or graft interpolymers consisting of two or more of these polyamides. Preferred polyamides are polyepsiloncaprolactam, polyhexamethylene adipamide. and a copolymer of polyepsiloncaprolactam and polyhexamethylene adipamide.

Also suitable for use herein are polyamide interpolymers comprising a polyamide and one or more comonomers. Non-limiting examples of such comonomers include acrylic or methacrylic acids and/or their derivatives, such as acrylonitrile, acrylamide, methyl, ethyl, propyl, butyl, 2-ethylhexyl, decyl and tridecyl esters of acrylic or methacrylic acid, vinyl esters such as vinyl acetate and vinyl propionate. vinyl aromatic compounds such as styrene, alpha-methyl styrene, and vinyl toluenes and vinyl ethers such as vinyl isobutyl ether.

It is further noted that the abovementioned polyamides containing various terminal functionalities are also suitable for use in the present invention. Preferred are polycaprolactams (nylon 6) containing (a) a chain, (b) a carboxylic group attached to one end and an acetamide group attached to the other end of the polymer chain, (c) an amino group attached to both ends of the polymer chain, and (d) a carboxyl group attached to one end and an amino group attached to the other end of the polymer chain. Particularly preferred is (d) above, a polycaprolactam having a carboxyl group attached to one end and an amino group attached to the other end of the polymer chain.

Reinforcing materials known in the art can be used to reinforce the compositions of the present invention. Useful materials include short organic and/or inorganic fibers, including but not limited to, fiberglass, polyaramide fibers and carbon fibers. Fiberglass is the preferred reinforcing material. Typically, the glass fiber used for reinforcement is at least about 0.125 mm in average length in the final product. Greater lengths (i.e., mean lengths of more than 0.125 mm in a major portion of the short-fiber reinforcement) may be retained by minimizing the amount of shear or mechanical breakdown of fiber length, with some sacrifice in homogeniety or prolonged processing times. Glass fibers as normally used for reinforcement of thermoplastics may be treated or coated with a sizing composition. Standard sizing agents usually consist of several components, each of which possesses a distinct function, e.g., binders, lubricants, coupling agents and the like. Formulations of this kind, and methods of use, are known to those skilled in the art.

Another constituent of the improved thermoplastic material herein described is particulate filler. Such fillers may be selected from a wide variety of minerals, metals, metal oxides, siliceous materials, metal salts, and mixtures thereof. These fillers may optionally be treated with various coupling agents or adhesion promotors, as is known to those skilled in the art. Examples of fillers included in these categories are alumina, aluminum hydrates, feldspar, asbestos, talc, calcium carbonates, clay, carbon black, quartz, novaculite and other forms of silica, kaolinite, bentonite, garnet, mica, saponite, beidelite, calcium oxide, calcium hydroxide, etc. The foregoing recited fillers are illustrative only, and are not meant to limit the scope of fillers that can be utilized in this invention.

Compositions useful as film can contain additional plasticizers such as non-polymeric amides, including but not limited to lactams such as caprolactam, lauryl lactam and the like.

Other minor additives which may be of value in the composition include antistatic agents, lubricants, nucleating agents, colorants, heat and light stabilizers, or other stabilizing aids.

The composition of the present invention is preferably made by melt blending. A preferred method is to blend a fiberglass-filled composition in an extruder above the polymer melt temperature. It is preferred to feed the glass fiber into the main mixture through a side port. The glass fiber can be fed in a second extrusion pass. If the glass fiber is to be fed into the throat of the extruder, it is preferred first to pre-blend the polymer and impact modifier. Preferred extruder conditions for polyepsiloncaprolactam are above 260° C. temperature profile. The filled composition can be used in conventional melt forming processes such as injection molding.

The composition of the present invention has been found to result in improved impact strength. The improvement is maintained in reinforced compositions, preferably with short glass fiber. It has been found that poly(amide-ether) block copolymers based on polyamide blocks of nylon-12 type are more effective than those based on nylon-6 type blocks in improving impact properties.

The nylon compositions in film form of the present invention can be made by melt-blending the composition and forming it into film by conventional thermal-forming methods such as extrusion and casting. Such compositions are typically not reinforced. A particularly preferred composition is a polyamide, preferably polycaprolactam and block copolymer of caprolactam and polypropylene glycol. The film can be oriented such as by uniaxial or biaxial forming by methods well known to those skilled in the art. Typically for use in the present invention, the polyamide film can be produced at draw ratios of from about 1.5 to about 6 to 1. The term "draw ratio" is used herein to indicate the increase of dimension in the direction of the draw. Therefore, nylon film having a draw ratio of 2:1 has its length doubled during the drawing process. Generally, the film is drawn by passing it over a series of preheating and heating rolls. The heated polyamide moves through a set of nip rolls downstream at a faster rate than the film entering the nip rolls at an upstream location. The change of rate is compensated for by stretching in the polyamide film.

The film made of the composition of the present invention has improved drape and hand properties. These are indications of the film stiffness and the ability of the film to conform to complicated shapes in processes such as vacuum molding and bagging. The film of the present invention preferably contains sufficient poly(amide-ether) block copolymer to have an ASTM D-4032 value of up to about 400 grams force (dry), and preferably from about 200 to about 400, and a Kawabeta test value of less than $8 \times 10^2$ g-cm$^2$/cm and preferably from about 2 to about $7 \times 10^2$ g-cm$^2$/cm (dry). The foregoing values are for films of about 0.056 millimeter (mm) thickness, or about 2 mils.

In preparing a film with a soft hand, it is desirable for the film to have a low modulus value in low tensile stress, while maintaining good tensile strength or ultimate elongation (UE). This combination of characteristics permits the film to drape, or conform, easily to a mold form, yet permits stretching of the film to conform to the mold under differential pressure, and further permits ready removability of the film from the mold after the forming operation has been concluded.

In the examples given hereinbelow, useful nylon films are described for applications such as, e.g., vacuum bagging, where both room-and high-temperature applications are important. Unmodified films tend to be unacceptably stiff, and do not conform well to complicated shapes. The films described in this invention are softer and more drapeable than those of the prior art, while maintaining good clarity, both as produced, and after exposure to heat such as would be experienced in the commercial use of the film.

EXAMPLES 1-4

Examples are set forth below to illustrate the nature of the invention and the manner of carrying it out. However, the invention should not be considered as being limited to the details thereof.

In the examples given hereinbelow, a high-molecular-weight polycaprolactam, or nylon-6, resin with a formic-acid viscosity (FAV) of about 125 was blended with various modifying agents, the amount of the modifying agent being shown in the tables. In each example, minor amounts of lubricant to aid processing was included; such materials are well known to those skilled in the art, and as such form no part of the present invention. The unmodified nylon composition containing the processing aids is the control in each example; the modifying materials were blended into the control composition. The resulting compositions were then formed into films and the films tested for low-tensile modulus, tensile strength and UE. In the tables, the control is unnumbered; various compositions included for comparison purposes are labeled "C 1" C 2", ect., and the examples showing the additive formulations giving rise to the present invention are labeled "Ex 1", etc.

The poly(amide-ether) block copolymers used in the examples are manufactured under the trade name "Pebax" by Rilsan Industrial, Inc., 1112 Lincoln Road, Birdsboro, Pa. 19508. These poly(amide-ether) block copolymers have the general formula

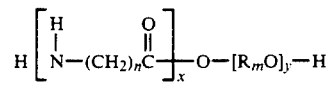

where R is an alkyl group with from one to about 12 carbons, n is an integer from 2 to 20, and preferably 4 to 12, m is an integer from 1 to 6, and preferably 2 to 4, and x and y are numbers from about 50 to about 30,000, preferably from about 2,000 to about 30,000. In the compositions described in the present invention, R is typically a linear or branched chain having from one to about six carbons, although these substituents are illustrative rather than limiting. The Pebax compositions used in the examples reported herein with the present invention having the numerical designations 2533, 3533, 4033 and 5533 are based on nylon-12 and polytetramethylene glycol, and have Shore D hardnesses of 25, 35, 40 and 55, respectively. The material designated Pebax 4011 is based on nylon-6 and polyethylene glycol, and has a Shore D hardness of 40. The Pebax designations 5512 and 6312 refer to materials based on nylon-6 and polypropylene glycol, with Shore D hardnesses of 55 and 63. "Santicizer" ® materials are trade names for low-molecular-weight plasticizers from Monsanto Company, St. Louis, Mo.; "Nucrell" ® is the trademark of the E.I. DuPont de Nemours Co. for terpolymers of ethylene, acrylic acid and acrylate esters.

The compositions contained the above-described nylon 6 and the indicated poly(amide-ether) shown in Table I. The materials were metered into an NRM single-screw extruder with a 24:1 length/diameter (L/D) ratio, using a conventional nylon melting screw. The melt temperature was in the range of about 260° to about 280° C. The melt was extruded through a slot die onto a cooled roll. Films so formed were determined to have a thickness of from about 0.056 (2 mils) to about 0.076 mm, and a width of from about 30 to about 40 centimeters (cm), or about 12 to 18 inches.

The testing described in Table I of the film was done in accordance with procedure D-882 of the American Society for Testing and Materials (ASTM), 1916 Race Street, Philadelphia, Pa. 19103. The drape and hand feel of the films were qualitatively determined, A indicating a soft hand with good drape, and C indicating the feel of the control. None of the films were stiffer than the control.

TABLE I

| Composition | Modifying Agent, wt. % | Drape Feel | Modulus kg/cm$^2$ | Tensile Strength at Break, kg/cm$^2$ | UE, % |
|---|---|---|---|---|---|
| — | Control | C | 11235 | 1026.5 | 378 |
| C 1 | Santicizer 8, 5% | B | 7797 | 921.0 | 368 |
| C 2 | Santicizer 9, 5% | B | 4099 | 850.7 | 361 |
| Ex 1 | Pebax 2533, 10% | C | 4148 | 766.3 | 376 |
| Ex 2 | Pebax 3533, 15% | A | 5512 | 421.8 | 270 |
| Ex 3 | Pebax 4011, 15% | A | 3832 | 773.4 | 365 |
| C 3 | Nucrell 010, 15% | C | 4697 | 836.7 | 397 |
| Ex 4 | Pebax 6312, 15% | B | 3635 | 949.1 | 380 |

Upon determination of the properties as set forth in Table I, film specimens were heat-aged at 175°±2° C. for four hours, followed by maintaining the samples at ambient temperature and 50% relative humidity (RH) for 30 minutes prior to testing, producing the results given in Table II, where the composition numbers correspond with those in Table I.

TABLE II

| Composition | Modulus kg/cm² | Tensile Strength at Break. kg/cm² | UE. % |
| --- | --- | --- | --- |
| — | 18976 | 625.7 | 242 |
| C 1 | 9892 | 506.7 | 138 |
| C 2 | 6644 | 520.7 | 212 |
| Ex 1 | 12965 | 499.6 | 211 |
| Ex 2 | 8050 | 450.4 | 66 |
| Ex 3 | 7424 | 598.1 | 324 |
| C 3 | 3832 | 464.4 | 124 |
| Ex 4 | 10201 | 654.4 | 307 |

From a consideration of the results, it is seen that the compositions containing the poly(amide-ether) block copolymer modifying agents exhibit low modulus, good tensile strength, and a high UE, all desirable properties for a film with good drapeability. Further, the tests on the heat-aged specimens show that the compositions modified with the block-copolymer materials retain good properties even after exposure to heat. It is thus concluded that the described materials provide film with both room- and high-temperature properties, and that a film of such composition has utility in, e.g., vacuum-bagging applications.

EXAMPLES 5-9

In the following examples, a high-molecular-weight polycaprolactam resin with an FAV of 125, having copper ion added to a level of 120 ppm of copper in the form of a halide salt for heat-stabilization, was blended with various modifying agents, the amount and nature of the modifying agent being shown in Table III. The mechanical properties of the film in the machine direction were then determined, both as formed and after heat-aging as described hereinabove.

TABLE III

| | Modifying Agent | Ambient Conditions | | | Heat-Aged | | |
| --- | --- | --- | --- | --- | --- | --- | --- |
| | | Modulus kg/cm² | Tensile Strength kg/cm² | UE % | Modulus kg/cm² | Tensile Strength kg/cm² | UE % |
| — | Control | 11235 | 1026.5 | 378 | 18976 | 625.7 | 242 |
| Ex 5 | Pebax 4011, 15% | 4134 | 885.9 | 320 | 7424 | 738.2 | 254 |
| Ex 6 | Pebax 5512, 15% | 4190 | 963.2 | 358 | 5779 | 850.7 | 384 |
| Ex 7 | Pebax 5512, 10% | 2707 | — | — | 6672 | 773.4 | 300 |
| Ex 8 | Pebax 6312, 15% | 4865 | 949.1 | 345 | 6419 | 724.2 | 249 |
| Ex 9 | Pebax 6312, 10% | 4795 | — | — | 7228 | 864.8 | 312 |

An inspection of the results reported in Table III reveals that the poly(amide-ether) block coploymers designated "Pebax" provide melt-blend compositions with lower tensile strength and modulus than the unmodified control, but that heat-aging of the compositions has only a minor effect on the tensile strength of the modified materials, while the control suffers a significant decrease in that property. The change in UE of the modified and unmodified compositions shows that the unmodified nylon is more brittle than the modified samples, after both are heat-aged. These observations lead to the conclusion that the modified materials have a softer hand than the base nylon, both before and after the aging process.

In order to verify the latter conclusion, the drapeability of films prepared as hereinbefore described was determined by testing performed on the compositions reported in Table III; the results of that testing are shown in Table IV, the composition numbers referring to the same compositions by the same numbers as used in Table III. The procedures used are those described in the succeeding paragraphs herein.

The circular-bend test was conducted in accordance with ASTM procedure D-4032. This test provides a force value related to fabric or film stiffness by simultaneously averaging stiffness in all directions.

The Kawabeta bending stiffness test provides data on pure bending of the film under consideration; the testing was performed on a pure-bending

TABLE V

| Comp. No. | Modifying Agent | Ambient Conditions | | | Heat-Aged | | |
| --- | --- | --- | --- | --- | --- | --- | --- |
| | | Modulus kg/cm² | Tensile Strength kg/cm² | UE % | Modulus kg/cm² | Tensile Strength kg/cm² | UE % |
| — | Control | 7523 | 1054.6 | 382 | 10440 | 963.2 | 373 |
| C 4 | — | 5674 | 1103.8 | 381 | 6208 | 639.8 | 234 |
| Ex 10 | Pebax 5512, 15% | 5449 | 892.9 | 419 | 6285 | 766.3 | 362 |
| Ex 11 | Pebax 5512, 15% | 5484 | 998.4 | 403 | 5716 | 836.7 | 358 |
| Ex 12 | Pebax 4033, 15% | — | 977.3 | 379 | 7270 | 885.9 | 375 |

The modified compositions described in Examples 18 through 21 were then further tested for drapeability by the circular-bend test, described above. The films tested dry were vacuum-dried at 50° C. for three days; those described as "conditioned" were held for 24 hours at 50% RH, and the films designated "equilibrium" were held at 30 to 40% RH for 14 days at 20°±2° C. The results are given in Table VI, all figures being grams of force measured.

TABLE VI

| Composition | Circular Bend Test, g. of force | | |
|---|---|---|---|
| | Dry | Conditioned | Equilibrium |
| C 4 | 567.0 | 453.6 | 399.2 |
| Ex 10 | 539.8 | 381.0 | 276.7 |
| Ex 11 | 743.9 | 480.8 | 299.4 |
| Ex 12 | 440.0 | 326.6 | 285.8 |

The results of the testing given in Tables V and VI disclose that the addition of small amounts of caprolactam to the modified compositions provides materials with desirable film characteristics. There is thus demonstrated the utility of the compositions for, e.g., vacuum-bag molding of plastic parts, film webs and the like.

EXAMPLES 13-29

It has further been discovered that nylon compositions with poly(amide-ether) block-copolymer modifiers as hereinbefore described exhibit good impact strength, and that reinforced nylon compositions also show good impact-strength characteristics.

In the following examples, polycaprolactam nylon with a 70 FAV was admixed by melt-blending with varying amounts of modifiers, with and without glass fibers added to the composition, with test results as shown.

The compositions were prepared on a 6.2 cm Egan extruder with a 40:1 L/D ratio with a downstream side port for the addition of glass where desired. The screw was a three-stage screw with two mixing sections to insure uniformity and proper outgassing of the molten composition. The extruded material was quenched in water at ambient temperature, following which surface moisture was removed by an air stripper, and the strands pelletized.

Standard ASTM test specimens were prepared by extrusion from a Van Dorn 180-gram (g.) reciprocating-screw injection-molding machine, Model number 135-RS-8. The melt temperatures maintained during extrusion were 275°±2° C.; during the molding step, temperatures were maintained between 275° and 290° C. In the following examples, the glass fiber used was standard type E, produced by PPG Industries with the designation PPG 3540, having a filament diameter of about 10 micrometers.

The materials with the designation "Pebax" are, as hereinbefore noted, proprietary products. The Pebax 4033 and 5533 materials are based on nylon 12; those with the designation 6312 are based on a six-carbon nylon.

Testing of the finished specimens was in accordance with ASTM methods as set forth hereinbelow:

| Property | ASTM Test # |
|---|---|
| Flexural Modulus | D-790 |
| Tensile Strength | D-638 |
| Notched Izod Impact Strength | D-256 |

Table VII gives the test results obtained on nylon compositions with and without the addition of glass reinforcement, the base nylon having an FAV of 70 and being modified by the addition of a Pebax material. The percentages indicated are based on total weight. In Table VII, the materials are grouped to show the results of nylon-6 modification with and without glass, and nylon-12 modification, with and without glass.

TABLE VII

| Composition | Modifying Agent, wt. % of Pebax # | Glass Fiber, wt. % | Flexural Modulus, kg/cm² | Notched Izod, g-cm/cm | Flexural Strength, kg/cm² |
|---|---|---|---|---|---|
| Control | — | — | 28801 | 5443 | 941.6 |
| Control | — | 32 | 95630 | 10553 | 2812.0 |
| Ex 22 | 4011; 10% | — | 26365 | 5824 | 1019.5 |
| Ex 24 | 6312; 10% | — | 25943 | 6586 | 1005.4 |
| Ex 28 | 4011; 15% | — | | 12519 | |
| Ex 29 | 6312; 15% | — | | 7620 | |
| Ex 23 | 4011; 20% | — | 24889 | 9253 | 892.9 |
| Ex 25 | 6312; 20% | — | 23834 | 8140 | 928.0 |
| Ex 17 | 6312; 5% | 15 | 48160 | 7076 | 1694.4 |
| Ex 21 | 4011; 5% | 15 | | 6641 | |
| Ex 19 | 6312; 10% | 10 | 87181 | 11920 | 2151.4 |
| Ex 18 | 4011; 10% | 35 | 80853 | 10505 | 1497.5 |
| Ex 26 | 2533; 10% | — | | 15241 | |
| Ex 13 | 4033; 10% | — | 23061 | 15567 | 892.3 |
| Ex 27 | 3533; 15% | — | | 23405 | |
| Ex 14 | 4033; 20% | — | 21795 | 21772 | 812.5 |
| Ex 20 | 4033; 5% | 14 | 47528 | 10832 | 1736.6 |
| Ex 16 | 4033; 5% | 15 | 48301 | 11539 | 1687.4 |
| Ex 15 | 5533; 5% | 15 | 48090 | 11376 | 1785.8 |

Based on the foregoing disclosure, it has been found that the nylon12-type block-copolymer modifier is more effective in improving notched Izod impact strength than is the material based on nylon 6, although the flexural moduli and flexural strengths of compositions so modified are substantially identical. From a consideration of the results shown in Table VII, there is demonstrated the utility of melt-blended compositions, both with and without reinforcement, for, e.g., molded automotive parts, implement handles and the like.

While exemplary embodiments of the invention have been described, the true scope of the invention is to be determined from the following claims.

What is claimed is:

1. A melt-blended composition comprising from about 70 to about 98% by weight of a polyamide, and from about 2 to about 30% by weight of a poly(amide-ether) block copolymer having the formula

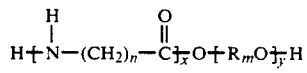

where R is an alkyl group having from one to 12 carbons, n is an integer from 20 to 20, m is an integer from 1 to 6, and x and y are numbers from 50 to 30,000.

2. The composition as recited in claim 1 wherein the polyamide is present in the amount of from about 85 to about 95% by weight and the poly(amide-ether)block copolymer polyamide is present in the amount of from about 5 to about 15% by weight.

3. The composition as recited in claim 1 wherein n is an integer from 2 to 12 and m is an integer from 1 to 4.

4. The composition as recited in claim 1 wherein n is an integer from 4 to 6 and m is 1.

5. The composition as recited in claim 1 wherein the polyamide is polycaprolactam.

6. The composition as recited in claim 1 wherein the polyamide has a formic-acid viscosity of from about 45 to about 150.

7. The composition as recited in claim 1 wherein the polyamide has a formic-acid viscosity of from about 70 to about 125.

8. The composition as recited in claim 1 having further from about 0.5 to about 3.5% by weight of a nonpolymeric amide.

9. The composition as recited in claim 8 wherein the amide is caprolactam.

10. A film formed from a melt-blended composition comprising from about 70 to about 98% by weight of a polyamide, and from about 20 to about 30% by weight of a poly(amide-ether) block copolymer having the formula

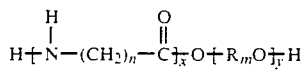

where R is an alkyl group having from one to 12 carbons. n is an integer from 2 to 20, m is an integer from 1 to 6, x and y are numbers from 50 to 30,000.

11. The composition as recited in claim 10 wherein the film is formed with a draw ratio of from about 1.5 to about 6 to 1 in at least one direction.

12. The composition as recited in claim 8, wherein the composition is drawn into a film.

* * * * *